United States Patent [19]

Kulkarni et al.

[11] Patent Number: 4,537,091
[45] Date of Patent: Aug. 27, 1985

[54] MATCHED METAL DIE COMPRESSION MOLDED STRUCTURAL RANDOM FIBER SHEET MOLDING COMPOUND FLYWHEEL

[75] Inventors: Satish V. Kulkarni, San Ramon; Richard M. Christensen, Danville, both of Calif.; Richard H. Toland, West Chester, Pa.

[73] Assignee: The United States of America as represented by the United States Department of Energy, Washington, D.C.

[21] Appl. No.: 479,193

[22] Filed: Apr. 1, 1983

Related U.S. Application Data

[63] Continuation of Ser. No. 190,305, Sep. 24, 1980, abandoned.

[51] Int. Cl.³ .......................... G05G 1/00; G05G 3/00
[52] U.S. Cl. ..................................................... 74/572
[58] Field of Search ........................................... 74/572

[56] References Cited

U.S. PATENT DOCUMENTS

| | | | |
|---|---|---|---|
| 2,388,293 | 11/1945 | Schroy et al. | 260/24 |
| 2,667,465 | 1/1954 | Nebesar | 260/40 |
| 3,296,886 | 1/1967 | Reinhart | 74/572 |
| 3,496,799 | 2/1970 | Call | 74/572 |
| 3,759,353 | 9/1973 | Marin | 188/71.5 |
| 3,788,162 | 1/1974 | Rabenhorst et al. | 74/572 |
| 3,884,093 | 5/1975 | Rabenhorst | 74/572 |
| 4,000,665 | 1/1977 | Rabenhorst | 74/572 |
| 4,028,962 | 6/1977 | Nelson | 74/572 |
| 4,098,142 | 7/1978 | Weyler | 74/572 |
| 4,102,221 | 7/1978 | Hatch | 74/572 |
| 4,186,245 | 1/1980 | Gilman | 74/572 |
| 4,198,878 | 4/1980 | Lewis et al. | 74/572 |
| 4,207,778 | 6/1980 | Hatch | 74/572 |
| 4,266,442 | 5/1981 | Zorzi | 74/572 |

OTHER PUBLICATIONS

Owens-Corning Fiberglass Corp., Publication 5-T-M-8364, "Structural SMC: Material, Process, & Performance Review", 1978.
Owens-Corning Fiberglass Corp., Publication 5-T-M-6991-A, "Sheet Molding Compound", 1977.
Steam & Gas Turbines, by Dr. A. Stodola, pp. 372-380, Reprinted 1945.
J. Composite Materials, "Optimal Design of Anisotropic (Fiber-Reinforced) Flywheels", Christensen et al., pp. 395-404, Oct. 1977.
Composite-Laminate Flywheel-Rotor Development Program, S. V. Kulkarni, Nov. 9, 1979, Preprint UCRL-83554.
R. G. Stone, "The Laminated Disk Flywheel Program-A Rotor Development Project by LLL & G.E. Co.", Proceedings of the 1978 Mechanical & Magnetic Energy Storage Contractors' Review Meeting-Conf-781046, Oct. 1978.
R. G. Stone, "Lawrence Livermore Laboratory-The Laminated Disk Flywheel Program", Preprint UCRL-81772, Oct. 24, 1978.
S. V. Kulkarni, et al., "Lawrence Livermore Laboratory-Prototype Development of an Optimized Tapered-Thickness, Graphite/Epoxy Composite Flywheel", UCRL-52623, Nov. 1978.
R. P. Nimmer, "Laminated Composite Disc Flywheel Development", UCRL-13973, Jan. 31, 1979.

Primary Examiner—Lawrence J. Staab
Attorney, Agent, or Firm—Gary C. Roth; L. E. Carnahan; Judson R. Hightower

[57] ABSTRACT

A flywheel (10) is described that is useful for energy storage in a hybrid vehicle automotive power system or in some stationary applications. The flywheel (10) has a body of essentially planar isotropic high strength structural random fiber sheet molding compound (SMC-R). The flywheel (10) may be economically produced by a matched metal die compression molding process. The flywheel (10) makes energy intensive efficient use of a fiber/resin composite while having a shape designed by theory assuming planar isotropy.

4 Claims, 3 Drawing Figures

MATCHED METAL DIE COMPRESSION MOLDED STRUCTURAL RANDOM FIBER SHEET MOLDING COMPOUND FLYWHEEL

The U.S. Government has rights in this invention pursuant to Contract No. W-7405-ENG-48 between the U.S. Department of Energy and the University of California for the performance of energy research and development work at the Lawrence Livermore Laboratory.

This is a continuation of application Ser. No. 190,305 filed Sept. 24, 1980, now abandoned.

BACKGROUND OF THE INVENTION

The invention described herein relates generally to flywheels, and more particularly to flywheels useful for energy storage as could be used in hybrid vehicle automotive power systems or in some stationary applications.

Prompted by recent national concern for energy conservation, there has been a substantial rebirth of interest in the technology of flywheels. Flywheels may be of use in energy storage systems and/or in land vehicle propulsion systems, inter alia. In particular, flywheels may be useful in power systems for hybrid automotive vehicles. Incorporating a flywheel in a battery powered vehicle may not only conserve energy but may also provide necessary acceleration and hill climbing performance.

Flywheels function as reservoirs of stored rotational kinetic energy. As rotational energy is withdrawn from a spinning flywheel, its angular speed decreases; as rotational energy is given to a flywheel, its angular speed increases. The kinetic energy of a flywheel as it rotates about its axis of symmetry is proportional to its moment of inertia multiplied by the square of its angular speed. The moment of inertia of a flywheel about its axis of symmetry depends upon the distribution of its mass. The angular speed of a flywheel cannot be increased without limit; at some angular speed, somewhere within the flywheel, the maximum allowable stress will be exceeded and the flywheel will permanently deform or, more probably, rupture and fly apart. Thus, other factors being equal, flywheels should be constructed of high strength material. Additionally, the energy per unit mass capable of being stored by a flywheel composed of an isotropic material would be maximized if the flywheel were so configured that, at rupture, its planar stresses were equal over its entire volume. This has been called a condition of two-dimensional hydrostatic stress which may be expressed by the rupture condition, throughout the entire flywheel, that:

$$s_o = s_r = s_t$$

where
- $s_o$ = the rupture stress of the flywheel material, a constant
- $s_r$ = the radial stress, and
- $s_t$ = the tangential stress.

Such a configuration, which can only be approached in actual practice, was theoretically discovered for a hypothetical flywheel extending to infinite radius by engineers of the de Laval Company in Sweden circa 1900. This flywheel configuration, called a Stodola shape or disk because it was first published in a book by A. Stodola ("Steam and Gas Turbines", The McGraw-Hill Book Company, Inc., New York, N.Y., 1927), has a shape given by:

$$t\ t_o\ \exp-(\rho\omega^2 r^2/2s_o),$$

where
- $t$ = the thickness of the flywheel at radius r,
- $t_o$ = the thickness of the flywheel on the axis (r=0),
- $\rho$ = the material density of the flywheel, and
- $\omega$ = the angular speed of the flywheel at rupture.

The Stodola disk is also characterized by:

$$m\omega^2 = 2\pi t_o s_o = 2\pi t_o \rho v = 2\pi t_o \rho E/m$$

where
- m = the mass of the infinite Stodola disk,
- E = the total kinetic energy in the Stodola flywheel at rupture, and
- $v$ = the ratio $s_o/\rho$ or E/m, the energy density in the Stodola flywheel at rupture.

Consequently, the theoretical maximum energy per unit mass that a flywheel composed of an isotropic material can store, and which could be stored by an infinite Stodola disk if one could be constructed, is given by the ratio of the stress at rupture to the density of the material of which the flywheel is composed.

Constructable flywheel shapes have been proposed that approach, in energy storage capability, the theoretical maximum. These shapes are related to the Stodola shape. For example Call, in U.S. Pat. No. 3,496,799, discloses the use of a shaped energy storage isotropic flywheel having decreasing thickness as one moves toward the circumference of the flywheel.

The rupture stress to density ratio is not particularly high for the homogeneous metals, such as steel, from which many prior art flywheels have been constructed. Because of this, metal flywheels are usually quite heavy. Additionally they can be very dangerous upon rupture as they break into relatively massive fragments. However, the maximum strength to density ratio can be quite high for composites of high strength fibers (composed, for example, of various graphite compounds or glasses) embedded in various bonding materials such as epoxy resins. Because of this, composite flywheels were developed. Most of the composites of which flywheels have been constructed have all fibers lying parallel to one another. Such unidirectional composites are characterized by being very strong in the direction of the fibers, but, because of the relative weakness of the bonding materials by also being only about 1 or 2 percent as strong in the directions perpendicular to the fibers.

In order to properly utilize unidirectional composites in flywheel construction designs based on the Stodola shape are inappropriate because planar stress equality is undesirable. U.S. Pat. No. 4,028,962 to Nelson teaches shaped anisotropic flywheel designs that include non-monotonic thickness variation as radial distance increases. Also see Christensen and Wu, "Optimal Design of Anisotropic (Fiber-Reinforced) Flywheels", J. Composite Materials, 11, (1977) 395. Optimized anisotropic flywheel designs are unappealing because they tend toward either zero or infinite thickness along their axes of symmetry.

Flywheels constructed of unidirectional composites are usually very expensive because they need to be assembled by relatively exotic techniques such as filament winding. A method for improving the strength of circumferentially wound carbon-fiber reinforced carbon bodies, as disclosed in U.S. Pat. No. 3,759,353 to Marin, is to wind the reinforcing fibers loosely and then subject them to axial compression to cause radial overlapping. Since most unidirectional composites are of relatively low density compared to most metals, composite flywheels must rotate at extremely high angular speeds to store significant amounts of kinetic energy. Rupture at these high angular speeds can be catastrophic both with respect to damage inflicted on the surrounding environment, and with respect to damage inflicted on the flywheel itself.

In an attempt to construct flywheels with planar isotropic characteristics from unidirectional composites, some prior art flywheels have been made by the vacuum-bag/press-molding method. This method consists of forming directionally ordered stacks of plies of uncured unidirectional composites. The stacks are vacuum-bag compacted and combined into layups. Each layup is put into a press and cured under vacuum at elevated temperatures. A flywheel is formed from the layup by removing it from the press and machining it as necessary. The method has been unsuccessful because experimental tests performed on vacuum-bag/press-molded flywheels have resulted in rupture at angular speeds well below those theoretically predicted. This and other recent work involving the application of high strength fiber composites in flywheel construction was presented by Satish V. Kulkarni at the "1979 Mechanical and Magnetic Energy Storage Contractors' Review Meeting", Oct. 19-22, 1979 at Washington, D.C. This material is published in, "Composite-Laminate Flywheel-Rotor Development Program", publication number UCRL-83554, by the Lawrence Livermore Laboratory of the University of California.

Disclosures have been made for improved and specialized molding compositions by, for example, Schroy, et al, in U.S. Pat. No. 2,388,293 and Nebesar in U.S. Pat. No. 2,667,465.

SUMMARY OF THE INVENTION

It is therefore an object of the invention to provide an improved fiber/resin composite flywheel that is shaped to have high energy storage capability according to design theory assuming planar isotropy, and that can substantially utilize the maximum strength to density ratio of the composite.

Another object of the invention is to provide a flywheel that can be produced economically.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the flywheel of this invention may comprise a matched metal die compression molded body constructed of sheet molding compound containing non-unidirectional fibers and resin. The plies of sheet molding compound are positioned for the most part perpendicular to the axis of rotation so that the flywheel is essentially planar isotropic.

Preferably the body of the flywheel is made up of sheet molding compound containing chopped fiber roving spread in a random pattern and resin.

The benefits and advantages of the present invention, as embodied and broadly described herein, include, inter alia, being able to make energy intensive efficient use of fiber/resin composites in the construction of flywheels having shapes designed by theory that assumes planar isotropy. The flywheels can be produced economically, are useful for energy storage, and can be used in hybrid vehicle automotive power systems or in some stationary applications.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
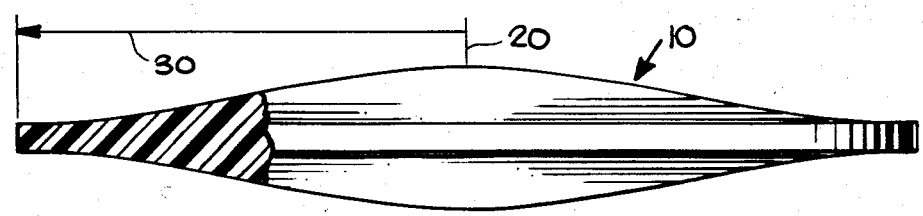
FIG. 1 is an elevation view, partially in cross section, of a flywheel made in accordance with the invention.
Figure 2:
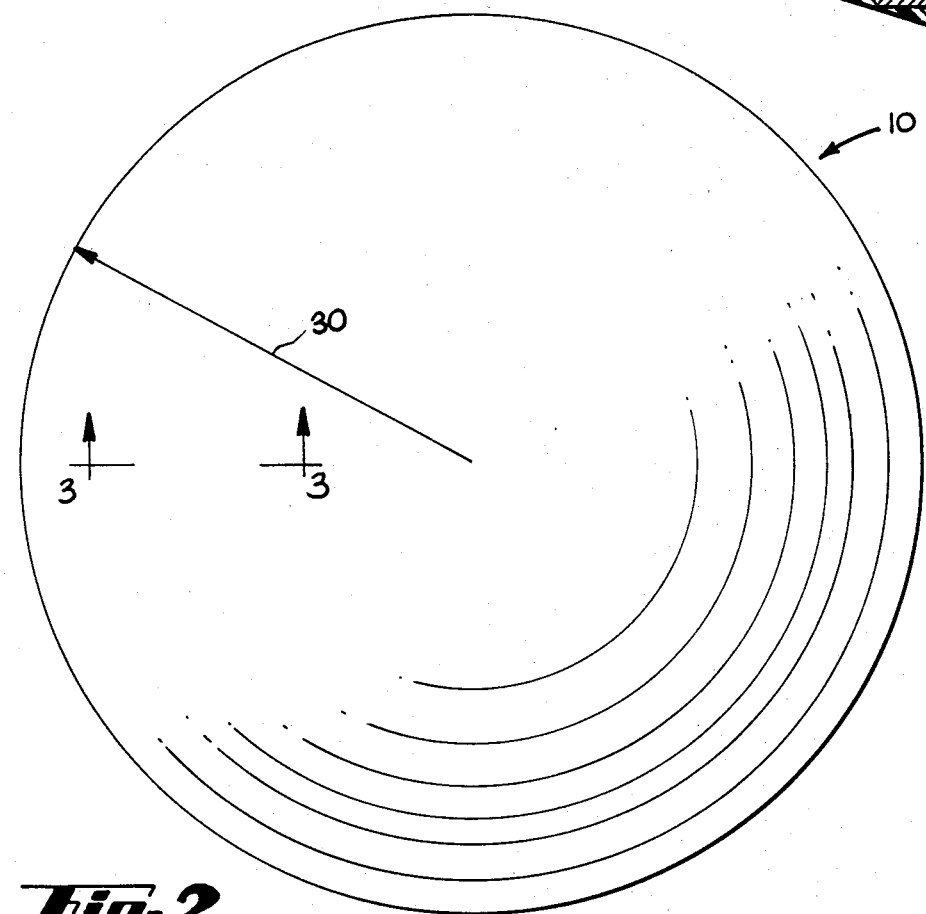
FIG. 2 is a plan view of the flywheel shown in FIG. 1.

Reference will now be made in detail to the present preferred embodiment of the invention, an example of which is illustrated in the accompanying drawings. In FIGS. 1 and 2 a flywheel 10 is composed of a body. The body of the flywheel has the characteristic Stodola shape from the axis of rotation 20 to the outer radius denoted by reference numeral 30. The outer surface of the flywheel, at the radius 30, is cylindrical. Thus, the flywheel of FIGS. 1 and 2 has what is termed a truncated Stodola shape.

Figure 3:
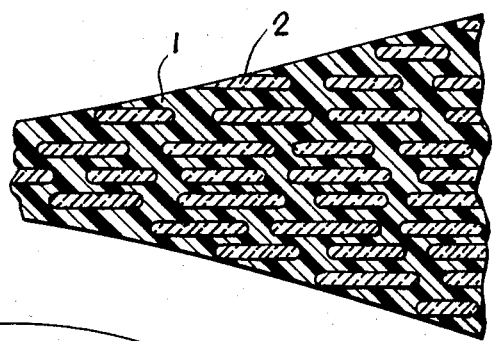
FIG. 3 is a partial elevation view, showing the material composition of the flywheel shown in FIG. 1.

In accordance with the invention, as shown in FIG. 3, the body of the flywheel is composed of pieces of chopped fiber glass 2, embedded in a resin 1. Specifically, the body is formed of sheet molding compound (SMC), preferably structural random fiber SMC. SMC is a non-unidirectional fiber composite available commercially through, for example, Owens-Corning Fiberglas Corporation. Sheet molding compound technology is described in, "Sheet Molding Compound", publication number 5-TM-6991-A published in 1976 by the Owens-Corning Fiberglas Corporation, and, "Structural SMC: Material, Process, and Performance Review", publication number 5-TM-8364 published in 1978 by the Owens-Corning Fiberglas Corporation. SMC parts are noted for high strength and for relatively low material and manufacturing costs. Items are formed from SMC sheet by a molding process. SMC sheet is formed by compacting high strength fiber glass roving and resin/filler paste between layers of carrier film. After maturation in a controlled environment the carrier film can be removed from the SMC; then plies cut from the sheet can be positioned upon one another to form a charge for placement in an appropriate mold. A part is formed from the charge when the mold is closed and subjected to the proper temperature and pressure in a matched-die molding process. SMC exists in a large number of possible types and compositions depending on molding limitations and the desired characteristics of the product to be made. SMC sheeting can be made utilizing continuous fibers and/or chopped fibers. In particular, structural SMC does not contain fillers and has a high fiber volume fraction; and, SMC sheet made from chopped fiber roving spread in a random pattern is called random fiber SMC (SMC-R). The body of the flywheel is composed of structural SMC-R because it is a very strong material and it is essentially planar isotropic. Flywheels molded from structural SMC-R will be made of material having a high rupture stress to density ratio. And, since during manufacture the plies will be positioned within the charge for the most part perpendicular to the axis of rotation, flywheels molded from structural SMC-R will be essentially planar isotropic and thus amenable to energy storage maximization via physical theory related to the Stodola disk. However, other versions of SMC may be employed in flywheel construction and still offer superior energy storage capabilities.

The invention disclosed herein may be incorporated into flywheels of any size. As applied in the preferred embodiment, the following example of specific dimensions is offered to illustrate application of the inventive principles disclosed herein to a specific flywheel. A flywheel composed of structural SMC-R of density approximately 1.94 gm/cm$^3$ and shaped according to the mathematical expression $$t = 2.54 \text{ cm exp} - 0.00105 \text{ cm}^{-2} r^2 \text{ where } 0 \leq r \leq 26.65 \text{ cm}$$

$$t = 0 \text{ where } r > 26.65 \text{ cm}$$

will be designed by theory assuming material planar isotropy and will make energy intensive efficient use of the fiber/resin composite of which it is constructed. The dimensions of the preferred embodiment were chosen because they are realistic for current application in power systems for hybrid automotive vehicles. However, they should be taken as merely illustrative of a possible actual application.

In accordance with the invention, an energy storage flywheel is provided having a body composed of high strength structural SMC-R. The body is economically produced by a matched metal die compression molding process such that the body is essentially planar isotropic.

The foregoing description of a preferred embodiment of the invention has been presented for purposes of illustration and description. It is not intended to be exhaustive or to limit the invention to the precise form disclosed, and many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A matched metal die compression molded flywheel body which is fundamentally planar isotropic only in all planes perpendicular to an axis of rotation, which comprises:
   a multiplicity of plies of sheet molding compound;
   each of said plies comprising a randomly oriented fiber and a resin compacted to be planar isotropic only in the plane of each said ply; and
   each of said plies being positioned essentially perpendicular to an axis of rotation of said flywheel body so that said flywheel body is fundamentally planar isotropic only in all planes perpendicular to said axis of rotation.

2. The flywheel body of claim 1, wherein said fiber comprises chopped fiber roving spread in a random pattern.

3. The flywheel body of claim 2, wherein said flywheel body is of a Stodola shaped configuration.

4. The flywheel body of claim 1, wherein said flywheel body is of a Stodola shaped configuration.

* * * * *